June 20, 1961 J. HEZLER, JR 2,989,338
MOUNTING AND SEALING MEANS FOR VEHICLE WINDOWS
Filed July 1, 1959 3 Sheets-Sheet 1

INVENTOR.
Julius Hezler, Jr.
BY
Herbert Furman
ATTORNEY

June 20, 1961   J. HEZLER, JR   2,989,338
MOUNTING AND SEALING MEANS FOR VEHICLE WINDOWS
Filed July 1, 1959   3 Sheets-Sheet 3
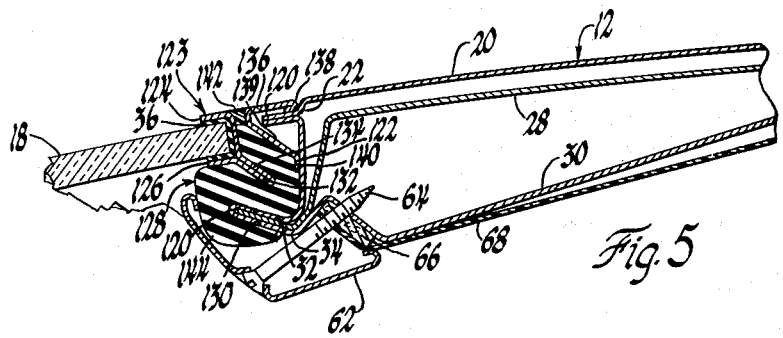
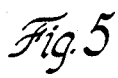
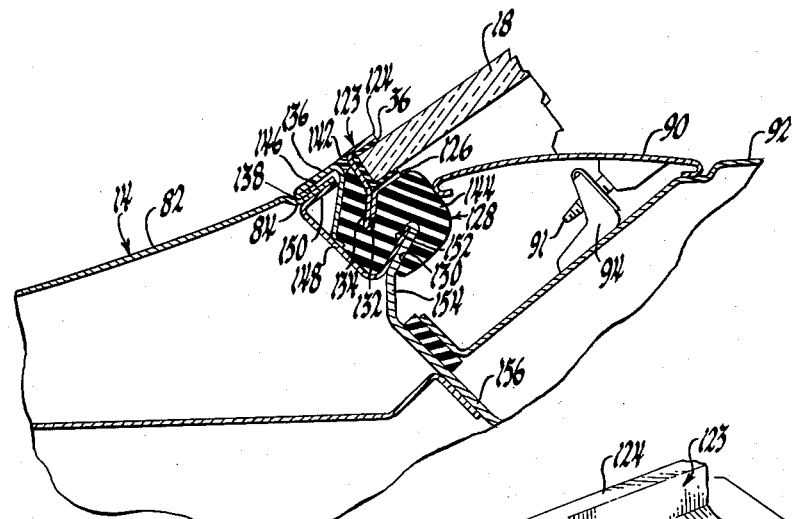
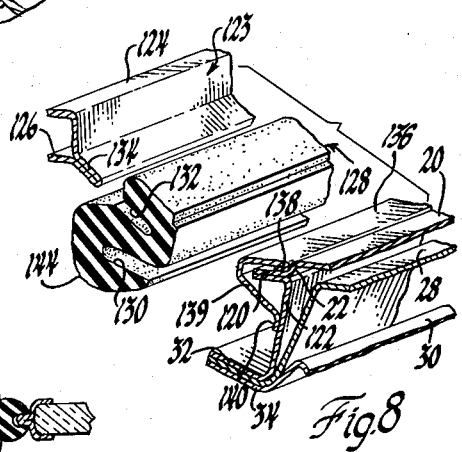
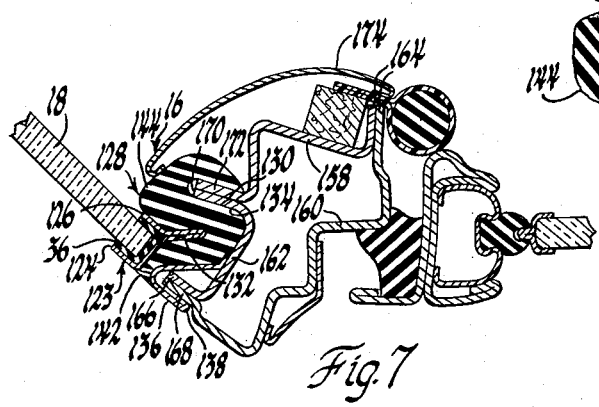
INVENTOR.
Julius Hezler, Jr.
BY
Herbert Furman
ATTORNEY United States Patent Office 2,989,338
Patented June 20, 1961

2,989,338
MOUNTING AND SEALING MEANS FOR
VEHICLE WINDOWS
Julius Hezler, Jr., East Detroit, Mich., assignor to General Motors Corporation, Detroit, Mich., a corporation of Delaware
Filed July 1, 1959, Ser. No. 824,410
6 Claims. (Cl. 296—93)

This invention relates to vehicle bodies and more particularly to mounting and sealing means for fixed vehicle windows, such as vehicle windshields and backlites.

In conventional practice, the mounting weatherstrip for the vehicle windshield or backlite is provided with oppositely opening channels, one of which receives body flange structure around the edge portion of the window opening to mount the weatherstrip on the body, and the other of which receives an edge portion of the window to thereby mount the window on the body. Since the edge portion of the window is received within a channel of the weatherstrip, a portion of the weatherstrip is located outboard of the window and sharply contrasts with the color of the adjacent body surface so as to require the use of an outer body garnish molding. Additionally, the body flange structure usually is not manufactured to high tolerance standards so that the weatherstrip is often distorted when mounted on the body to distort the channel receiving the edge portion of the window and thereby create a high possibility of both air and moisture leakage into the body from between the edge portion of the window and the weatherstrip. Further, since the weatherstrip is located between the edge portion of the opening and the edge portion of the glass, a window of maximum size cannot be used.

The mounting and sealing means of this invention overcomes the several difficulties and disadvantages of conventional mounting and sealing means by locating the weatherstrip entirely inboard of the edge portion of the window and providing a decorative channel molding which is rigidly secured to the edge portion of the window and has an integral flange portion extending laterally inboard of the body into a suitable channel provided in the weatherstrip. Thus, air and moisture leakage from between the edge portion of the glass and the weatherstrip are effectively prevented and a window of greater size can be provided since the decorative molding is very thin and can be located closely adjacent the edge portion of the body window opening. In accordance with one embodiment of this invention, for use with certain body conditions, the decorative molding may be further provided with another laterally extending outboard flange portion which may overlie a portion of the adjacent body surface to thereby provide a neat appearance to the body. In accordance with another embodiment of this invention, a separate outer molding may be provided to overlie a portion of the adjacent outer body surface and seat closely adjacent to the decorative molding.

The primary object of this invention is to provide an improved mounting and sealing means for fixed vehicle windows such as vehicle windshields and backlites.

This and other objects of this invention will be more readily apparent from the following specification and drawings, wherein:

FIGURE 5 is a view similar to FIGURE 2 showing the other embodiment of this invention;

FIGURE 6 is a view similar to FIGURE 3 showing the other embodiment of this invention;

FIGURE 7 is a view similar to FIGURE 4 showing the other embodiment of this invention; and FIGURE 8 is an exploded view of a portion of FIGURE 5.

Figure 1:
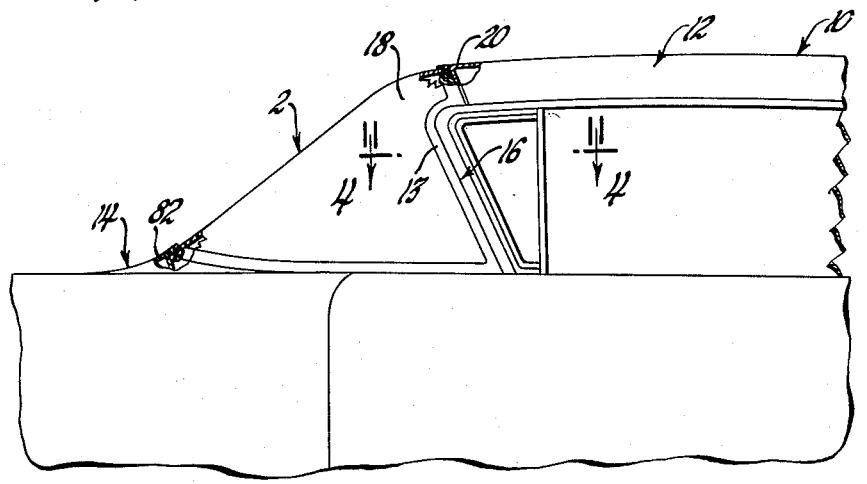
FIGURE 1 is a partial side elevational view of a vehicle body embodying a mounting and sealing means according to one embodiment of this invention.

Referring now particularly to FIGURE 1 of the drawings, a vehicle body 10 includes a roof structure 12, the forward edge portion of which defines the upper edge portion of the windshield opening 13 of the body. The lower edge portion of the opening 13 is defined by the body cowl structure 14 and the side edges of the opening are defined by the windshield pillar structures 16. The windshield opening 13 receives a windshield 18 which is mounted therein by a mounting and sealing means according to one embodiment of this invention.

Figure 2:
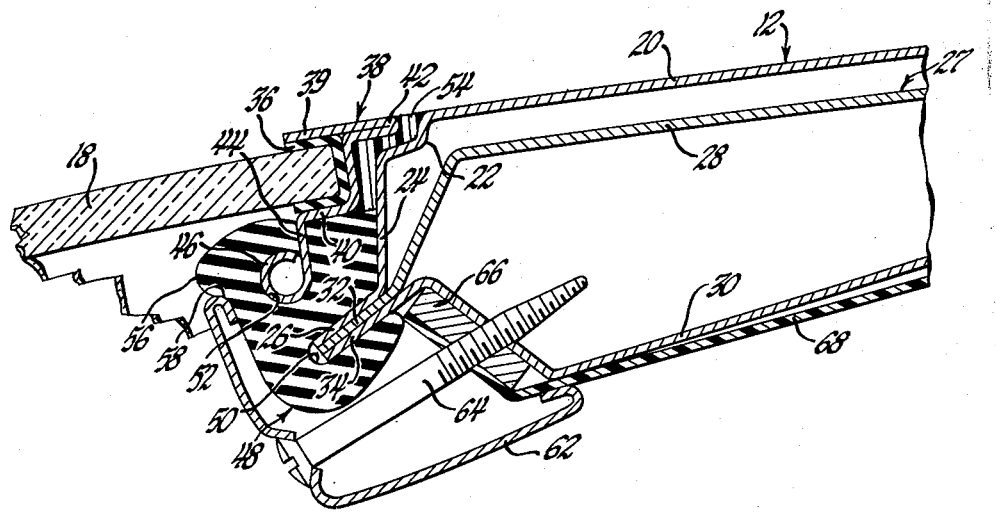
FIGURE 2 is an enlarged view of the upper broken away portion of FIGURE 1.

As best shown in FIGURE 2 of the drawings, the roof structure 12 of the body includes a roof panel 20 provided with a rabbeted portion 22 at its forward edge from which extends a lateral flange 24 terminating in a terminal angular flange 26. The windshield header 27, which spans the body between pillars 16, is provided by a pair of generally channel shaped members 28 and 30, each including a terminal flange 32 and 34, respectively, which are secured to each other and to flange 26 to provide what is commonly known as a body pinch weld structure. The upper edge portion of the windshield 18 is received within a thin channel 36 of rubber or other suitable sealing material which in turn is received within a generally channel shaped chrome plated molding 38. The outboard and inboard legs 39 and 40, respectively, of the molding 38 tightly clamp against the legs of the channel 36 to thereby fixedly mount the molding 38 on the upper edge portion of the windshield 18. As shown, the outboard leg 39 of molding 38 generally follows the contour of the outer surface of the windshield 18 and the contour of the roof panel 20 and is joined to the base wall of the molding by an integral double thickness folded flange 42 which overlies the rabbeted portion 22 of panel 12 in closely spaced relationship thereto.

The inboard leg 40 of molding 38 includes an integral laterally inwardly extending flange 44 which terminates in a generally closed bead 46. A windshield mounting weatherstrip 48 includes a pair of channels 50 and 52, with channel 50 grippingly receiving the body pinch weld structure provided by flanges 26, 32 and 34 to thereby mount the weatherstrip 48 on the body. The channel 52 is generally coextensive with the shape of the flange 44 and the bead 46 and grippingly receives the flange and bead to thereby mount the upper edge portion of the windshield on the body. It will be noted that the upper edge portion of the windshield generally overlies the weatherstrip 48 so that the weatherstrip is located entirely inboard of the body and no portion thereof projects outboard of the body to the outboard side of the windshield as is common in conventional practice. It will be further noted that the weatherstrip generally seals against flanges 24 and 26 of the roof panel and also against the inboard leg 40 of molding 38 to thereby provide a tight seal against air and moisture leakage into the interior of the body from between the weatherstrip and the pinch weld structure and from between the weatherstrip and flange 44 and bead 46.

The space between the flange 42 and the rabbeted portion 22 and between the base wall of the molding 38 and the juxtaposed portion of flange 24 is filled with a suitable sealer 54, to provide a very tight seal between the molding 38 and the roof panel. Since the space filled by the sealer is kept as small as possible within ordinary manufacturing tolerances, it can be seen that only a thin strip portion of the sealer would be visible from the exterior of the body and, if desired, the sealer may be colored to match the color of panel 20 so as to further reduce any contrast between the sealer and the outer surface of the molding 38 or panel 20.

The weatherstrip 48 includes a laterally extending rib 56 which provides a shoulder 58 with the adjacent surface of the weatherstrip. An upper windshield garnish molding 62 has a return bent flange thereof bearing against this shoulder 58 so as to locate the garnish molding on the body and conceal the major portion of the weatherstrip 48 from view from both within and from without the body through the windshield 18. The garnish molding 62 is mounted on the body by a number of screws 64 which screw into header member 30. Screws 64 also serve to mount a tacking strip 66 on the member 30 so as to anchor the forward edge portion of the body headlining 68.

Figure 3:
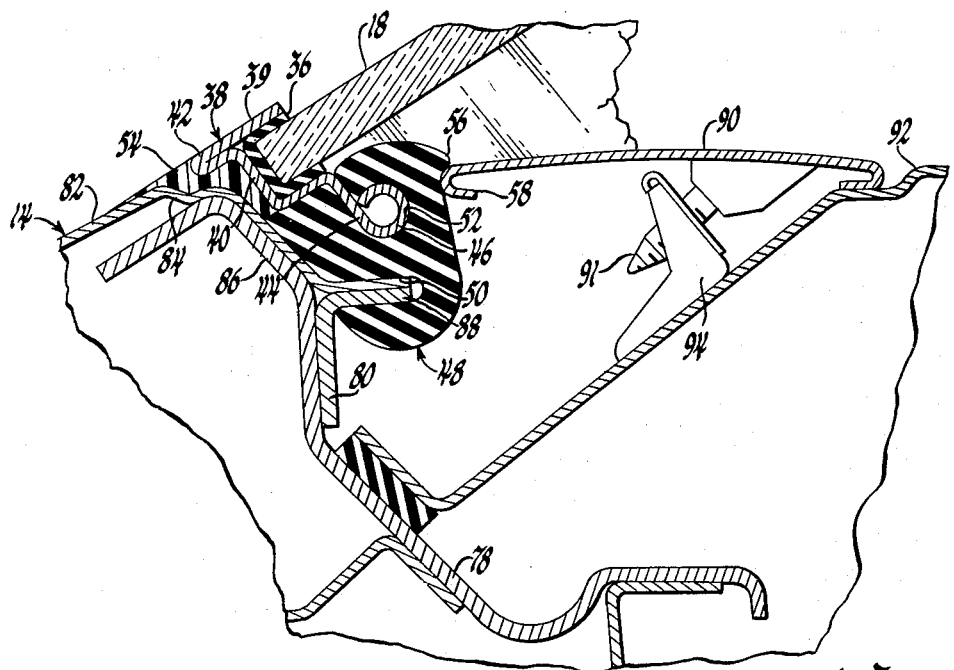
FIGURE 3 is an enlarged view of the lower broken away portion of FIGURE 1.

Referring now to FIGURE 3 of the drawings, wherein like numerals will be used for like parts, the cowl structure 14 includes a reinforcing member 78 which extends across the body and wraps rearwardly on either side thereof to the pillars 16. An angle reinforcing member 80 is secured to member 78 and is coextensive therewith. The cowl panel 82 of the body includes a rabbeted portion 84 and terminal flange structure which generally follows the contour of flange 86 of member 78 and flange 88 of member 80, being secured to flange 88 to provide the pinch weld structure along the lower edge portion of the windshield opening. Since the weatherstrip 48 is mounted on this pinch weld structure in the same manner as it is mounted on the pinch weld structure across the upper edge portion of the opening 13, and since the decorative channel 38 and sealer are located in the same relationship to the rabbeted portion 84 of the cowl panel 82 as to the rabbeted portion 22 of panel 20, it is believed that no further description need be given. A lower windshield garnish molding 90 fits between the upper instrument panel wall 92 and shoulder 58 of the weatherstrip across the lower edge portion of the windshield to conceal the weatherstrip 48 in this area. Molding 90 is secured to the body by screws 91 which are threaded into brackets 94 secured to wall 92.

Figure 4:
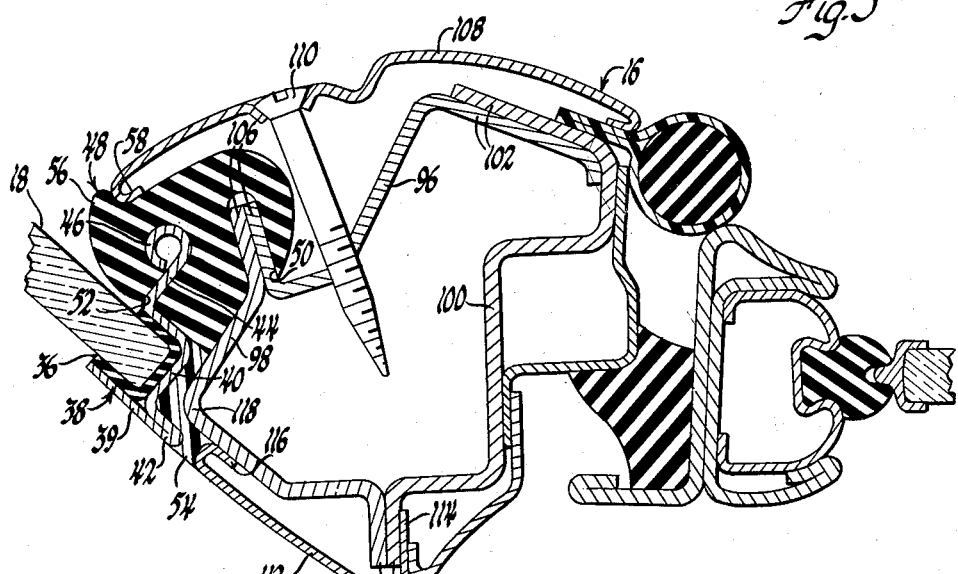
FIGURE 4 is an enlarged sectional view taken generally along the plane indicated by line 4—4 of FIGURE 1.

Referring now particularly to FIGURE 4 of the drawings, wherein like numerals will again be used for like parts, each of the body side pillars 16 is of like construction and includes three structural members 96, 98 and 100. Members 96 and 100 include overlapping flanges 102 which are spot welded together; members 98 and 100 include abutting flanges 104 which are spot welded together; and members 96 and 98 include abutting flanges 106 which are spot welded together to provide the body pinch weld structure along the side edges of the windshield 18. The weatherstrip 48 is mounted on this pinch weld structure along the side edges of the windshield and is concealed from view from the interior of the body by a side windshield garnish molding 108 having a return bent terminal flange engaging shoulder 58 and being mounted on the body by a number of screws 110 which thread into the member 96. An outer body panel 112 has a flange 114 hooked over flanges 104 of members 98 and 100 and a terminal return bent flange 116 which seats against member 98 adjacent a shoulder 118 thereof so as to provide a rabbeted like portion therewith similar to the rabbeted portion 22 of the roof panel and rabbeted portion 84 of the cowl panel.

Referring now to FIGURES 5, 6 and 7 of the drawings, which correspond to FIGURES 2 through 4, respectively, and to FIGURE 8, the other embodiment of this invention will be described. Like numerals will be used for like parts since this embodiment has several structural features in common with the hereinbefore described first embodiment of the invention.

As shown in FIGURES 5 and 8, the rabbeted portion 22 of panel 20 terminates in a flange 120 and a channel shaped body structural member 122 has one leg thereof welded to the flange 120 and the other leg thereof welded to the flanges 32 and 34 of members 28 and 30 respectively, to provide the body pinch weld structure across the upper edge portion of the windshield opening 13 between the side pillars 16. The generally channel shaped chrome plated molding 123 of this embodiment of the invention includes outboard and inboard legs 124 and 126, respectively, which tightly clamp the channel 36 to the upper edge portion of the windshield 18. The windshield mounting weatherstrip 128 includes a pair of oppositely opening channels 130 and 132, channel 130 receiving the pinch weld structure provided by flanges 32 and 34 and the other leg of member 122 to mount the weatherstrip on the body. Channel 132 receives a double thickness integral folded flange 134 of molding 122 to thereby mount the upper edge portion of the windshield 18 on the body. As shown, the weatherstrip seals against the inboard leg 126 and the base of the molding 123 as well as sealing against member 122 and the other leg thereof. A decorative chrome plated molding 136 includes a return bent terminal flange 138 which seats on the rabbeted portion 22 of panel 20, and an inboard angularly extending flange 139 which seats against the weatherstrip 128 and terminates in a flange 140 which seats against the base of member 122. The small amount of space between the juxtaposed base portion of member 123 and flange 139 of member 136 is sealed by a sealer 142 which may be colored, if desired, to match the surface of panel 20. It can be seen that the outboard leg 124 of member 123 and the outboard leg of member 136 continue the contour of the roof panel 20. The upper windshield garnish molding 62 seats against surface 144 of weatherstrip 128.

Referring now to FIGURE 6 of the drawings, wherein like numerals will be used for like parts, the rabbeted portion 84 of cowl panel 82 terminates in a flange 146. A generally channel shaped reinforcing member 148 has the outboard leg 150 thereof secured to flange 146 and the inboard leg 152 thereof secured to a flange 154 of a body structural member 156 corresponding to member 78. The flange 154 and leg 152 provide the body pinch weld structure across the lower edge portion of the windshield opening which is received within the channel 130 of weatherstrip 128. Member 90 seats on surface 144 of the weatherstrip.

As shown in FIGURE 7 of the drawings, each of the body pillar structures 16 includes three structural members 158, 160 and 162. Members 158 and 160 include abutting terminal flanges 164 which are spot welded together. It will be noted that member 162 is generally channel shaped with the outboard leg 166 thereof secured to an offset flange 168 of member 160 and the inboard leg 170 thereof being secured to an abutting flange 172 of member 158 to provide the body pinch weld structure which is received within the channel 130 of the molding 128. The rabbeted portion of the body which receives the return bent flange 138 of molding 136 is provided by the offset flange 168 of member 160 in this area of the body. The side windshield garnish molding 174 includes return bent terminal flanges which seat against flanges 164 and against surface 144 of weatherstrip 128 to thereby conceal the major portion of the weatherstrip from view from the interior of the body.

It is desirable that the weatherstrips 48 and 128 be continuous around the edge portion of the windshield 18 in order to prevent any possibility of air or moisture leakage into the body. While it is also preferable that the moldings 38 and 123 be continuous, this presents problems in the mounting of the moldings to the windshield and accordingly the moldings may be split up into a number of pieces as desired. This is also true with regard to the moldings 136.

Thus this invention provides a new and improved mounting and sealing means for a fixed vehicle window such as a vehicle windshield. It will be noted that both embodiments of this invention locate the weatherstrip entirely inboard of the edge portion of the windshield around the windshield opening and mount the windshield on the body by providing a decorative channel molding which includes a laterally inwardly extending flange portion received within an opening in the weatherstrip.

I claim:

1. In combination with a vehicle body having a window opening therein, resilient weatherstrip means having a weatherstrip channel therein, means mounting said weatherstrip means on said body adjacent said opening therein to locate said weatherstrip means inwardly of the outer edge portion of said window opening with said weatherstrip channel opening generally outboard of said body, a window panel located outboard of said weatherstrip means adjacent said outer edge portion of said window opening, a molding channel member secured to the edge portion of said window panel, the outer leg of said molding channel member being located generally coplanar to said outer edge portion of said window opening and the inner leg of said molding channel member seating on said weatherstrip means adjacent said weatherstrip channel therein to locate said window panel within said window panel opening and resiliently seat said window on said weatherstrip means, and means extending generally inboard of said body from said molding channel member, said molding channel member means being grippingly received within said weatherstrip channel to hold said inner leg of said molding channel member in sealing engagement with said weatherstrip means.

2. In combination with a vehicle body having a window opening therein, resilient weatherstrip means having a weatherstrip channel therein, means mounting said weatherstrip means on said body adjacent said opening therein to locate said weatherstrip means inwardly of the outer edge portion of said window opening with said weatherstrip channel opening generally outboard of said body, a window panel located outboard of said weatherstrip means adjacent said outer edge portion of said window opening, a molding channel member fixedly secured to the edge portion of said window panel, the outer leg of said molding channel member being located generally coplanar to said outer edge portion of said window opening and the inner leg of said molding channel member seating on said weatherstrip means adjacent said weatherstrip channel therein to locate said window panel within said window opening and resiliently seat said window panel on said weatherstrip means, said molding channel member including an integral channel member extension extending generally inboard of said body, said extension being grippingly received within said weatherstrip channel to hold said inner leg of said molding channel member in sealing engagement with said weatherstrip means.

3. In combination with a vehicle body having a window opening therein provided with a rabbeted outer edge portion, resilient weatherstrip means having a weatherstrip channel therein, means mounting said weatherstrip means on said body adjacent said opening therein to locate said weatherstrip means inwardly of said outer edge portion of said window opening with said weatherstrip channel opening generally outboard of said body, a window panel located outboard of said weatherstrip means adjacent said outer edge portion of said window opening, a molding channel member fixedly secured to the edge portion of said window panel, the outer leg of said molding channel member being located generally coplanar to said outer edge portion of said window opening and the inner leg of said molding channel member seating on said weatherstrip means adjacent said weatherstrip channel therein to locate said window panel within said window opening and resiliently seat said window panel on said weatherstrip means, said molding channel member including a pair of integral extensions, one of said extensions overlying said rabbeted outer edge portion of said window opening and the other of said extensions being grippingly received within said weatherstrip channel to hold said inner leg of said molding channel member in sealing engagement with said weatherstrip means.

4. In combination with a vehicle body having a window opening therein, resilient weatherstrip means having a weatherstrip channel therein, means mounting said weatherstrip means on said body adjacent said opening therein to locate said weatherstrip means inwardly of the outer edge portion of said window opening with said weatherstrip channel opening generally outboard of said body, a window panel located outboard of said weatherstrip means adjacent said outer edge portion of said window opening, a molding channel member fixedly secured to the edge portion of said window panel, the outer leg of said molding channel member being located generally coplanar to said outer edge portion of said window opening and the inner leg of said molding channel member seating on said weatherstrip means adjacent said weatherstrip channel therein to locate said window panel within said window opening and resiliently seat said window panel on said weatherstrip means, and integral means extending generally inboard of said body from said molding channel member and being complementary in shape to said weatherstrip channel, said channel member means being grippingly received within said weatherstrip channel to hold said inner leg of said molding channel member in sealing engagement with said weatherstrip means.

5. In combination with a vehicle body having a window opening therein, resilient weatherstrip means having a weatherstrip channel therein, means mounting said weatherstrip means on said body adjacent said opening therein to locate said weatherstrip means inwardly of the outer edge portion of said window opening with said weatherstrip channel opening generally outboard of said body, a window panel located outboard of said weatherstrip means adjacent said outer edge portion of said window opening, a molding channel member fixedly secured to the edge portion of said window panel, the outer leg of said molding channel member being located generally coplanar to said outer edge portion of said window opening and the inner leg of said molding channel member seating on said weatherstrip means adjacent said weatherstrip channel therein to locate said window panel within said window opening and resiliently seat said window panel on said weatherstrip means, said molding channel member including a flange extending inwardly therefrom and terminating in a generally beaded end portion, said flange being grippingly received within said weatherstrip channel to hold said inner leg of said molding channel member in sealing engagement with said weatherstrip means.

6. In combination with a vehicle body having a window opening therein, resilient weatherstrip means having a weatherstrip channel therein, means mounting said weatherstrip means on said body adjacent said opening therein to locate said weatherstrip means inwardly of the outer edge portion of said window opening with said weatherstrip channel opening generally outboard of said body, a window panel located outboard of said weatherstrip means adjacent said outer edge portion of said window opening, a molding channel member fixedly secured to the edge portion of said window panel, the outer leg of said molding channel member being located generally coplanar to said outer edge portion of said window opening and the inner leg of said molding channel member seating on said weatherstrip means adjacent said weatherstrip channel therein to locate said window panel within said window opening and resiliently seat said window panel on said weatherstrip means, said molding channel member including a double folded flange extending inwardly therefrom, said flange being grippingly received within said weatherstrip channel to hold said inner leg of said molding channel member in sealing engagement with said weatherstrip means.

References Cited in the file of this patent

UNITED STATES PATENTS

| | | |
|---|---|---|
| 1,696,588 | Bailey | Dec. 25, 1928 |
| 1,997,822 | Hamm | Apr. 16, 1935 |
| 2,456,175 | Coppock | Dec. 14, 1948 |
| 2,610,713 | Bradley | Sept. 16, 1952 |
| 2,671,541 | Kramer | Mar. 9, 1954 |
| 2,793,071 | Meyer | May 21, 1957 |

FOREIGN PATENTS

| | | |
|---|---|---|
| 193,246 | Great Britain | Feb. 22, 1923 |